(12) United States Patent
Castelaz et al.

(10) Patent No.: US 8,519,670 B2
(45) Date of Patent: Aug. 27, 2013

(54) SYSTEM AND METHOD FOR BALANCING CHARGE WITHIN A BATTERY PACK

(75) Inventors: Jim Castelaz, Mountain View, CA (US); Jessica Riley, Mountain View, CA (US); Vishal Parikh, Palo Alto, CA (US); Steven Diamond, San Mateo, CA (US); Samuel Chang, San Jose, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 479 days.

(21) Appl. No.: 12/730,174

(22) Filed: Mar. 23, 2010

(65) Prior Publication Data

US 2010/0237830 A1    Sep. 23, 2010

Related U.S. Application Data

(60) Provisional application No. 61/210,847, filed on Mar. 23, 2009.

(51) Int. Cl.
*H02J 7/00* (2006.01)

(52) U.S. Cl.
USPC .......................................... 320/118

(58) Field of Classification Search
USPC ................................. 320/116–123
See application file for complete search history.

(56) References Cited

U.S. PATENT DOCUMENTS

| | | |
|---|---|---|
| 5,498,950 A | 3/1996 | Ouwerkerk |
| 5,656,915 A | 8/1997 | Eaves |
| 5,710,504 A | 1/1998 | Passcual et al. |
| 5,818,201 A | 10/1998 | Stockstad et al. |
| 5,920,179 A | 7/1999 | Pedicini |
| 5,982,143 A | 11/1999 | Stuart |
| 5,998,967 A | 12/1999 | Umeki et al. |
| 6,064,178 A | 5/2000 | Miller |
| 6,114,835 A | 9/2000 | Price |
| 6,121,751 A | 9/2000 | Merritt |
| 6,459,236 B2 * | 10/2002 | Kawashima .................. 320/118 |
| 6,518,725 B2 | 2/2003 | Marten |
| 6,624,612 B1 * | 9/2003 | Lundquist ..................... 320/118 |
| 6,700,350 B2 | 3/2004 | Formenti et al. |
| 6,738,692 B2 | 5/2004 | Schienbein et al. |
| 6,777,908 B2 | 8/2004 | Thorne et al. |
| 6,841,971 B1 | 1/2005 | Spee et al. |

(Continued)

OTHER PUBLICATIONS

Multiplexer, available on Jan. 6, 2007 at http://web.archive.org/web/20070106000816/http://en.wikipedia.org/wiki/Multiplexers.*

(Continued)

*Primary Examiner* — Melissa Koval
*Assistant Examiner* — Daniel Miller
(74) *Attorney, Agent, or Firm* — Jeffrey Schox

(57) ABSTRACT

A system for balancing charge within a battery pack with a plurality of cells connected in series, including a capacitor; a processor configured to select a combination of donor cells and receiver cells from the plurality of cells in one of the following two modes: (1) a first mode where the number of donor cells is equal to the number of receiver cells, and (2) a second mode where the number of donor cells is greater than the number of receiver cells; and a plurality of switches that electrically connect the capacitor to the donor cells to charge the capacitor, and that electrically connected the capacitor to the receiver cells to discharge the capacitor. The transfer of charge between cells in the plurality of cells through the capacitor balances the charge within the battery pack.

24 Claims, 8 Drawing Sheets

(56) References Cited

U.S. PATENT DOCUMENTS

| | | |
|---|---|---|
| 7,081,737 B2 * | 7/2006 | Liu et al. ............... 320/130 |
| 7,245,108 B2 | 7/2007 | Chertok et al. |
| 7,307,402 B2 | 12/2007 | Parent et al. |
| 7,598,706 B2 | 10/2009 | Koski et al. |
| 2008/0303484 A1 * | 12/2008 | Lee et al. ............... 320/134 |

OTHER PUBLICATIONS

Quadratic programming, available on Feb. 13, 2008 at http://en.wikipedia.org/wiki/Quadratic_programming.*

* cited by examiner

SYSTEM AND METHOD FOR BALANCING CHARGE WITHIN A BATTERY PACK

CROSS-REFERENCE TO RELATED APPLICATIONS

This application claims the benefit of U.S. Provisional Application No. 61/210,847 filed on 23 Mar. 2009 and entitled "Multiple Cell Charge Pump for Active Battery Management", which is incorporated in its entirety by this reference.

TECHNICAL FIELD

This invention relates generally to the portable electric power field, and more specifically to a new and useful charge balancing system and method in the battery pack management field.

BACKGROUND AND SUMMARY

Battery packs are increasingly produced with many battery cells that are electrically connected to each other within the battery pack. While of the same specification, each battery cell within battery packs may operate differently; in particular, each battery cell may hold charge differently. This may be a result of manufacturing differences between cells, age difference between cells, or any other suitable source of differences. A battery pack with cells that are at different charge levels may have a decreased battery pack lifetime. For example, a cell within a battery pack that has a higher charge level may operate at a temperature that is higher than an optimal operating temperature for the cell. This may cause that particular cell within the battery pack to catastrophically fail, which may then lead to neighboring cells catastrophically failing and/or may lead to failure of the battery pack. This is especially true when the rate of energy transfer to and from the battery pack is substantially high (for example, during high power charge or discharge situations). If there is a charge imbalance within the battery pack, a high rate of energy transfer to and from the cells may cause the charge imbalance to be further amplified in a substantially short period of time, which may lead to increased chance of failure of the battery pack.

Currently available systems and methods for balancing charge include dissipating extra charge from imbalanced cells, which results in the waste of the extra charge through the resistors. Other available systems balance charge by transferring charge from one cell to another. Available charge balancing circuits are complicated and expensive to manufacture (e.g., charge balancing circuits that require sensors and capacitors at each cell within the battery pack). Other available charge balancing circuits may be too slow in balancing charge within the battery pack (e.g., charge balancing circuits that transfer charge between imbalanced cells by utilizing the difference in voltage potential between the imbalanced cells, which may be very slow if difference is relatively small, and/or may only allow for charge transfer between certain cells within the battery pack). As mentioned above, charge imbalances may be amplified in a substantially short period of time in scenarios where the rate of energy transfer to and from the battery pack is high. If the charge balancing circuit is not fast enough to balance charge to prevent the amplification of charge imbalance, battery pack failure may not be prevented.

Thus, there is a need in the battery pack management field to create a new and useful charge balancing system and method that is relatively simple, cost effective, fast, and flexible. This invention provides such a new and useful charge balancing system and method.

The system of the preferred embodiments for balancing charge within a battery pack with a plurality of cells connected in series includes a capacitor, a processor that is configured to select a combination of donor cells and receiver cells from the plurality of cells in one of the following two modes: a first mode where the number of donor cells is equal to the number of receiver cells and a second mode where the number of donor cells is greater than the number of receiver cells, and a plurality of switches that electrically couple the capacitor to the donor cells to charge the capacitor, and electrically couple the capacitor to the receiver cells to discharge the capacitor. The charge balancing system may also include a sensor coupled to each of the plurality of cell that senses or determines the charge of each cell. In this variation, the processor is configured to utilize the sensed charge to select a combination of donor cells and receiver cells. In the preferred embodiments, charge is moved between cells of the battery pack through the charge and discharge of the capacitor, and the movement of the charge between the donor cells and the receiver cells balances the charge within the battery pack.

In existing prior art, such as U.S. Pat. No. 6,518,725, charge is moved from a cell with a higher voltage potential to a cell with a lower voltage potential through a capacitor. The initial charge/discharge rate (or charge/discharge current) of the capacitor is directly related to both the time constant (which is determined by the capacitance of the capacitor and the total resistance within the circuit) and the difference in voltage potential between the capacitor and the cell that charges/discharges the capacitor. For any set time constant, the speed of cell balancing circuits that moves charge from one cell to another is limited by the maximum voltage potential difference between the two cells. In most cases, especially for cells whose state of charge is neither very high nor very low, the voltage potential difference between two imbalanced cells may not be very large, further slowing the charge transfer rate. The resulting charge transfer rate in such charge balancing circuits may not be fast enough for certain usage scenarios. For example, an increased rate of energy transfer into or out of the battery pack during high power charging or discharging may amplify existing charge imbalances in a very short period of time, which may lead to catastrophic failure of the battery pack. In a more specific example, a particular cell within the battery pack may charge at a rate that causes its voltage to increase at an average of 0.5 volts per hour faster than other cells in the battery pack. A charge balancing circuit that is slow (for example, capable of transferring only enough charge away from the imbalanced cell and into other cells in the battery pack to decrease the voltage of the imbalanced cell by 0.1 volts per hour) will not be fast enough to prevent the imbalanced cell from becoming more imbalanced and possibly failing.

In the system of the preferred embodiments, the processor may select a combination of donor cells and receiver cells in a first mode where the number of donor cells and receiver cells are equal and in a second mode where the number of donor cells is greater than the number of receiver cells. In usage scenarios that require a faster speed of charge balancing, the processor may select a combination of donor cells and receiver cells according to the second mode. For example, a substantially large number of donor cells that are connected in series (for example, if the number of the plurality of cells is N, then the number of donor cells may be up to N cells) to charge the capacitor and a substantially small number of receiver cells that are connected in series (for example, one) to discharge the capacitor. Thus, the voltage potential difference between the donor cells connected in series and the capacitor is significantly high, increasing the initial charge rate of the capacitor. The charged capacitor is then at a substantially higher voltage potential than the receiver cell, increasing the initial discharge rate of the capacitor and substantially increasing the charge transfer rate between the cells within the battery pack. Additionally, the increased combined voltage potential of the donor cells allows for an increased amount of charge to be transferred to the receiver cells in a fixed-time charge and discharge cycle of the capacitor, increasing the speed of charge balancing within the battery pack over existing charge balancing circuits by orders of magnitude. The processor may alternatively select any other suitable combination of donor cells and receiver cells to increase the charge transfer rate between cells.

With increased rate of charge transfer between the donor cells, the capacitor, and the receiver cells, there may be a decrease in charge transfer efficiency between cells. For example, with the increased charge current, energy may be lost through heat dissipated through the circuit. Thus, in usage scenarios that do not require a high rate of charge transfer between cells, the processor may select a combination of donor cells and receiver cells according to the first mode. For example, one donor cell and one receiver cell. This will result in a lower initial charge/discharge rate of the capacitor, which may allow for an increase in charge transfer efficiency between cells. Alternatively, the processor may select a combination of donor cells and receiver cells according to the second mode, but with a smaller difference between the number of donor and number of receiver cells. The processor may alternatively select any other suitable combination of donor cells and receiver cells to increase the charge transfer efficiency between cells.

The charge balancing system of the preferred embodiments allows for increased flexibility in charge balancing. By allowing selection of combinations of donor cells and receiver cells of a first and a second mode, any number of and any of the plurality of cells may function as donor cells and receiver cells interchangeably and the rate of charge transfer and the efficiency of charge transfer between cells may be optimized for different usage scenarios, which may result in a more balanced and healthy battery pack.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Balancing Charge

Figure 1:
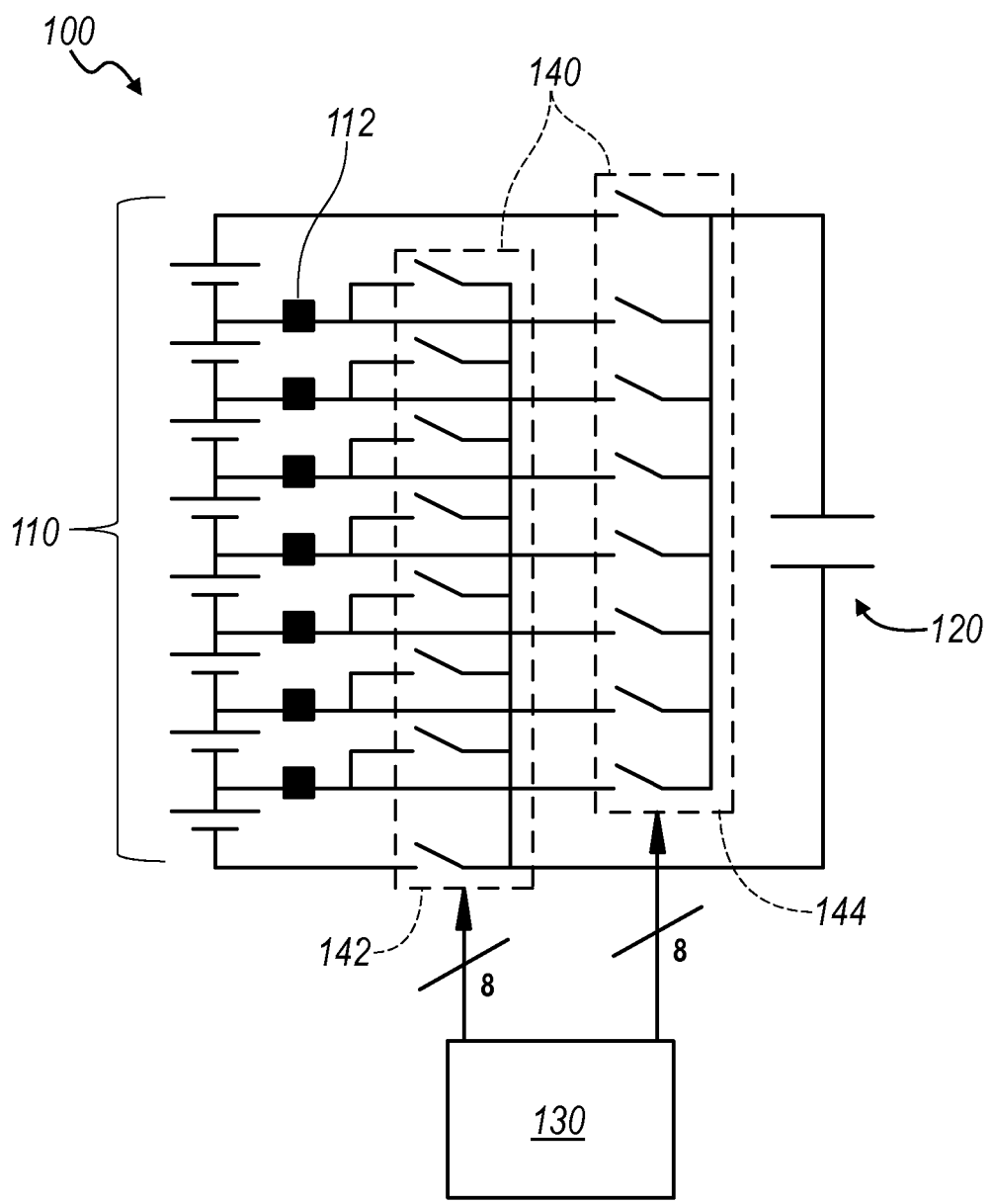
FIG. 1 is a schematic representation of the charge balancing system of the preferred embodiments.

As shown in FIGS. 1 and 2, the system 100 of the preferred embodiments for balancing charge within a battery pack with a plurality of cells 110 connected in series includes a capacitor 120, a processor 130 that is configured to select a combination of donor cells 114 and receiver cells 116 from the plurality of cells 110 in one of following two modes: a first mode where the number of donor cells is equal to the number of receiver cells and a second mode where the number of donor cells is greater than the number of receiver cells, and a plurality of switches 140 that electrically couple the capacitor 120 to the donor cells 114 to charge the capacitor 120 and electrically couple the capacitor to the receiver cells 116 to discharge the capacitor 120. The charge balancing system 100 may also include a sensor 112 coupled to each of the plurality of cells 110 that senses or determines the charge of each cell and the processor 130 is configured to utilize the sensed charge to select a combination of donor cells 114 and receiver cells 116. In the preferred embodiments, charge is moved between cells 110 of the battery pack through the charge and discharge of the capacitor 120, and the movement of the charge between the donor cells 114 and the receiver cells 116 preferably balances the charge within the battery pack.

The charge balancing system 100 of the preferred embodiments is preferably applied to a battery pack with a plurality of cells 110 that are connected in series. As shown in FIGS. 1 and 2, the plurality of cells 110 may include eight cells 110 that are connected in series, but may alternatively include any other suitable number of cells connected in series. Each cell in the battery pack may be connected in series. Alternatively, a portion of the cells in the battery pack may be connected in series; for example, the cells in the battery pack may be arranged in a combination of series and parallel electrical connections. In this variation, the charge balancing system 100 is preferably applied to the portion of cells in the battery pack that is connected in series. However, the charge balancing system 100 may be applied to any other suitable combination of cells within the battery pack. Each of the plurality of cells 110 is preferably a unitary energy storage unit, but may alternatively include multiple energy storage units that are connected to each other in series, parallel, or any other suitable combination of series and parallel electrical connections to form a cell 110. For example, each cell 110 may be a group of individual energy storage units that are connected in parallel and the charge balancing system 100 preferably balances charge among each group of energy storage units. However, the plurality of cells 110 may be of any other suitable type of arrangement. The battery pack may be used for any suitable electrical power application, for example, a portable computer, a mobile phone, a grid-connected battery backup system, an electric vehicle, or a hybrid-electric vehicle. However, the charge balancing system 100 may be applied to any other suitable type of battery pack.

Figure 2A:
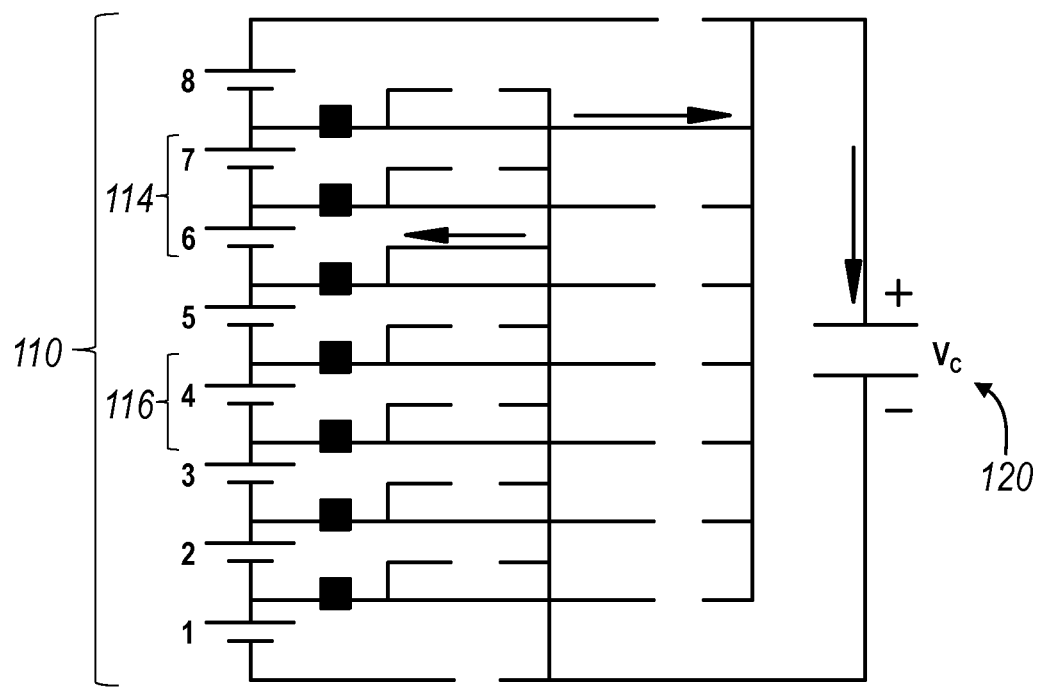
FIGS. 2a and 2b are schematic representations of the movement of charge between the plurality of cells when charging the capacitor and discharging the capacitor, respectively.
Figure 2B:
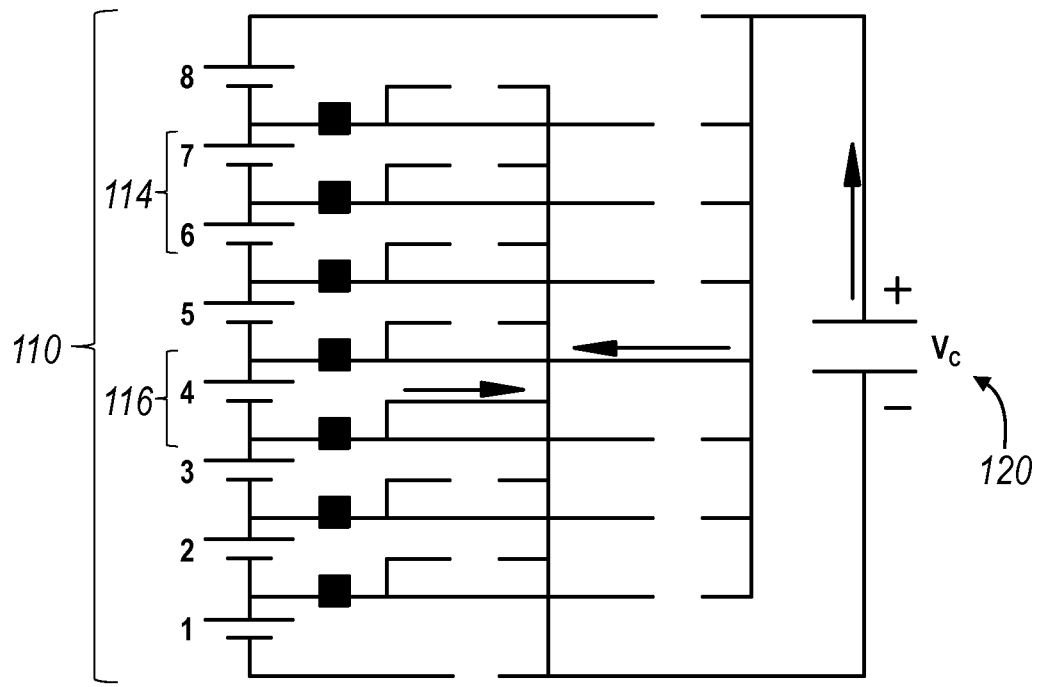
Figure 2C:
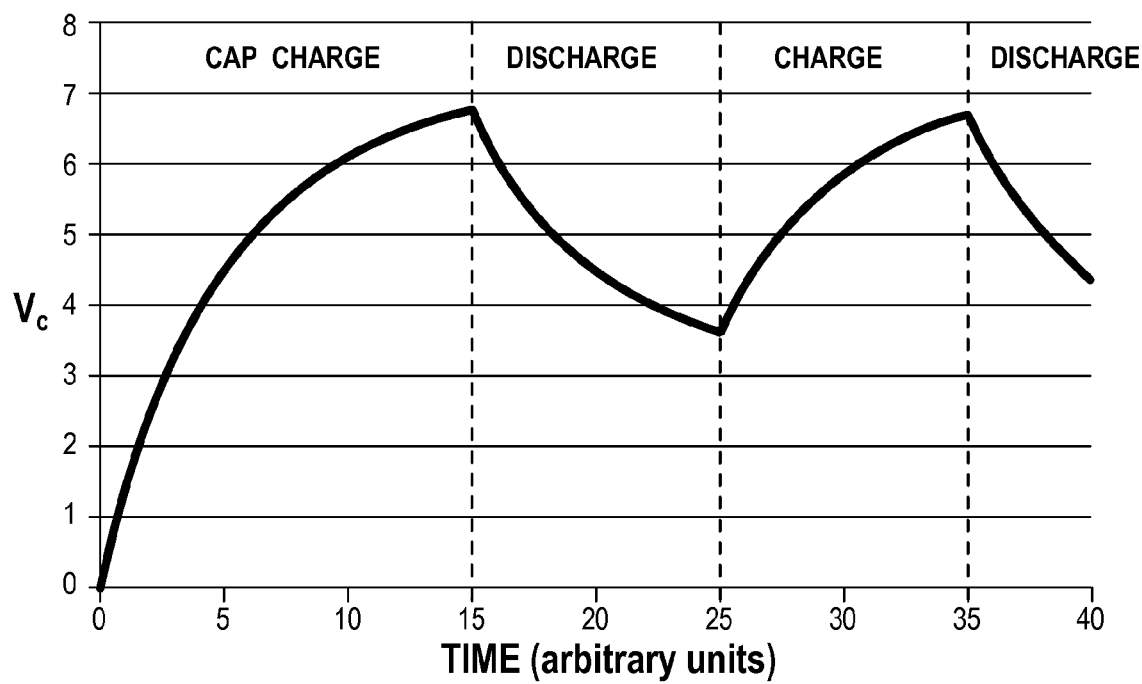
FIG. 2c is a graphical representation of the charge within the capacitor during charge and discharge cycles.

As shown in FIGS. 2a, 2b, and 2c, the plurality of switches 140 of the preferred embodiments couples the capacitor 120 to at least one donor cell 114 (two donor cells 114(6) and 114(7) are shown in FIGS. 2a and 2b) to charge the capacitor 120, and then couples the capacitor 120 to at least one receiver cell 116 (one receiver cell 116(4) is shown in FIGS. 2a and 3b) to discharge the capacitor 120. As shown in FIG. 2c, the charge and discharge cycle of the capacitor 120 is preferably repeated, The processor may also select a second combination of donor cells 114 and receiver cells 116 and the charge balancing cycle may be repeated with the second combination. This repetitive process may continue until all of the cells 110 are substantially equally charged. The processor 130 preferably actuates the plurality of switches 140, but the plurality of switches 140 may alternatively be coupled to a second processor that communicates with the processor 130 to receive communication on the combination of the donor cells 114 and receiver cells 116 to connect to the capacitor using the plurality of switches 140.

The plurality of switches 140 is preferably arranged to connect any single cell 110 or any combination of any contiguous cells 110 to the capacitor 120 as donor cells 114 and receiver cells 116. The plurality of switches 140 is preferably capable of coupling each cell as a donor cell 114 and receiver cell 116 interchangeably, depending on the combination of donor cells 114 and receiver cells 116 selected by the processor. As shown in FIG. 1, a first variation of the plurality of switches 140 includes a first set of switches 142, each with one end electrically connected to the negative terminal of a cell 110 and another end electrically connected to one terminal of the capacitor 120. The plurality of switches 140 also includes a second set of switches 144, each with one end electrically connected to the positive terminal of a cell 110 and another end electrically connected to the other terminal of the capacitor 120. As shown in FIGS. 2a and 2b, when a switch from the first set of switches 142 coupled to the negative terminal of a cell (here shown as cell number 114(6)) is actuated and a switch from the second set of switches 144 coupled to the positive terminal of another cell (here shown as cell number 114(7)) is actuated, the cells 110 in between the actuated switches are then electrically connected in parallel with the capacitor 120 (here shown as donor cells 114). Similarly, when a switch of the first set of switches 142 coupled to the negative terminal of a cell (here shown as cell number 114(4)) is connected and a switch of the second set of switches 144 coupled to the positive terminal of the same cell is connected, only that one cell is coupled electrically connected in parallel with the capacitor 120 (here shown as a receiver cell 116). This arrangement of the plurality of switches 140 allows for any number of and any selection of the plurality of cells 110 to be electrically connected to the capacitor 120.

Each switch within the first and second sets of switches 142 and 144 are preferably individually controlled to establish the desired electrical connection with the capacitor 120 with the donor cells 114 and the receiver cells 116. The number of switches in each of the first set of switches 142 and the second set of switches 144 is preferably the same number of the plurality of cells 110. However, the number of switches in each set of switches 142 and 144 may be less than the number of the plurality of cells 110, for example, two cells may be treated as a group that are always concurrently connected to the capacitor 120. However, there may be any other suitable number of switches in the first and second set of switches 142 and 144. Each of the switches 140 in this variation may be a transistor, for example, a field effect transistor (FET) such as a metal oxide semiconductor field effect transistor (MOSFET), or a bipolar transistor. The switches 140 is preferably able to stand off the voltage of the plurality of cells 110 connected in series, in other words, when not actuated, each of the switches preferably does not allow flow of current from the plurality of cells 110. However, the switches 140 in this variation may be any other suitable type of switch.

Figure 3:
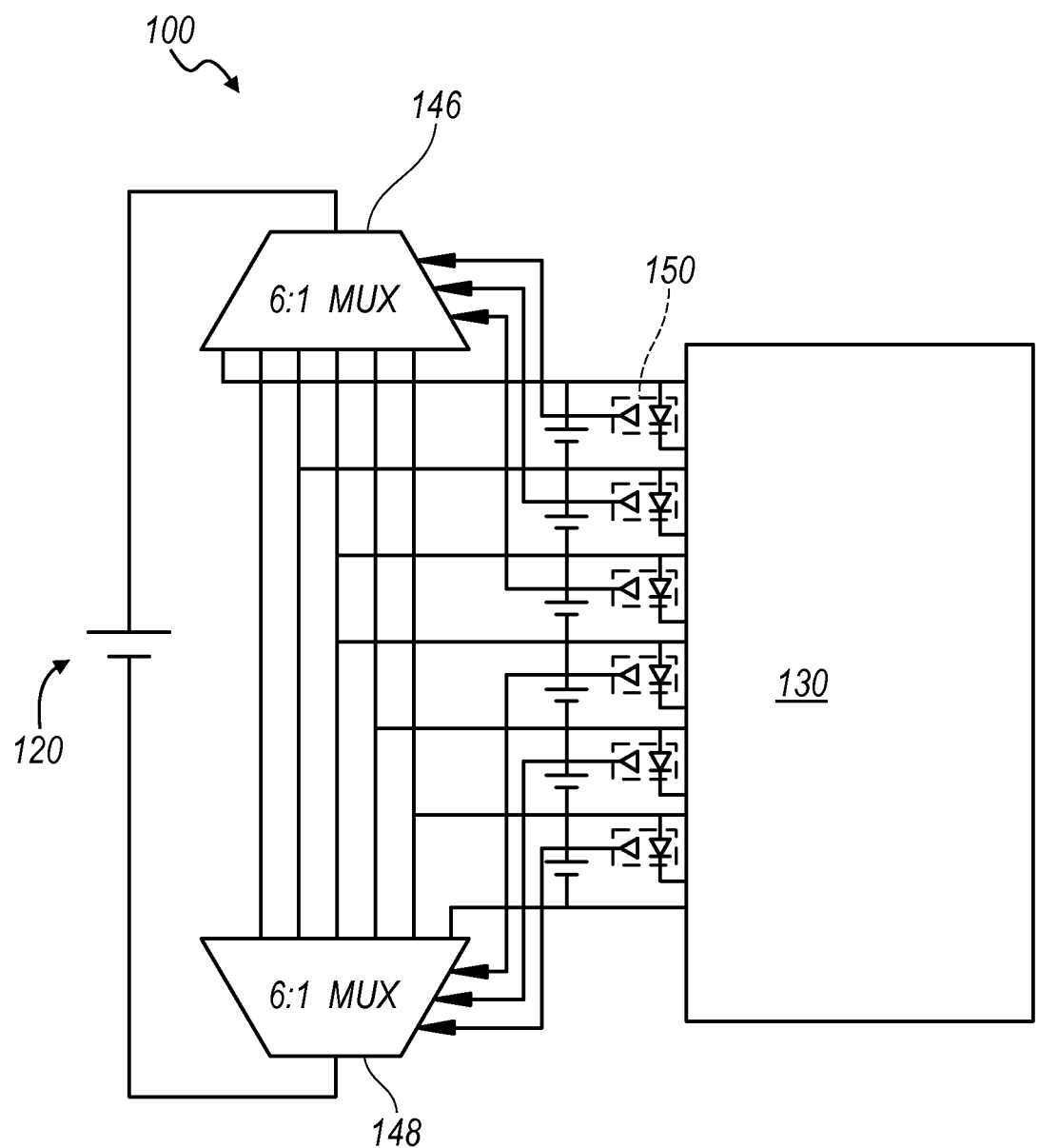
FIG. 3 is a schematic representation of the charge balancing system of the preferred embodiments with a second variation of the plurality of switches.

In a second variation, as shown in FIG. 3, the plurality of switches 140 may include a multiplexer 146. The multiplexer 146 functions to simplify the signals necessary to actuate the plurality of switches 140 to couple the desired donor cells 114 and receiver cells 116 to the capacitor 120. By simplifying the signals necessary to actuate the plurality of switches 140, fewer control signals are necessary and computational power required may be less, which may decrease the cost of the charge balancing circuit. The multiplexer 146 may function to replace one of the first set of switches 142 or the second set of switches 144 of the first variation and preferably couples the plurality of cells 110 to the capacitor 120 in a similar or identical manner as in the first variation. The plurality of switches 140 may include a first and second multiplexer 146 and 148, where the first multiplexer 146 replaces the first set of switches 142 and the second multiplexer 148 replaces the second set of switches 142. Both the first and second multiplexers 146 and 148 preferably function to couple the plurality of cells 110 to the capacitor 120 in a similar or identical manner as the first and second set of switches 142 and 144, respectively, of the first variation. In this variation, the number of cells in the plurality of cells 110 is preferably of a power of two, which allows more efficient use of the multiplexers as the plurality of switches 140. However, the multiplexer of the second variation may be of any other suitable type. Additionally, any other suitable component may be used to simplify the signals necessary to actuate the plurality of switches 140 to couple the desired donor cells 114 and receiver cells 116 to the capacitor 120.

As mentioned above, in the variations with more than one donor cell 114 and/or more than one receiver cell 116, the plurality of switches 140 preferably also couples each donor cell 114 to each other in a series connection and each receiver cell 116 to each other in a series connection. However, the plurality of switches 140 may alternatively couple each donor and receiver cell 114 and 116 in any other suitable arrangement, for example, the plurality of switches 140 may couple each receiver cell 116 to each other in a parallel connection to maintain a substantially low combined voltage potential of the receiver cells 116. However, the plurality of switches 140 may be of any other suitable arrangement.

The capacitor 120 of the preferred embodiments functions to accept a charge from the donor cells and discharge a charge to the receiver cells. The capacitance of the capacitor 120 preferably holds a substantial amount of charge (such as 33 milli-Farads), which may decrease the time needed to balance charge between cells. The capacitor 120 is preferably of a non-variable type and preferably has substantially low charge leakage to increase the efficiency of charge transfer between cells. The capacitor 120 is preferably of a substantially small size to allow integration into the battery pack. However, the capacitor 120 may be of any other suitable type of capacitor.

The charge and discharge cycle of the capacitor during charge balancing is preferably based on the capacitance and the total resistance of the circuit. The total resistance of the circuit may substantially result from the resistance in the plurality of switches 140 (the individual switches in the first variation and the multiplexers in the second variation). The charge and discharge times of the capacitor 120 during cell balancing (in other words, the time that the plurality of switches electrically couples the donor cells 114 or receiver cells 116, respectively, to the capacitor 120) is preferably fixed. In this variation, the amount of charge transferred in one charge and discharge cycle depends on the difference in voltage potential between the donor cells 114 and the receiver cells 116. The charge time selected preferably allows for the capacitor 120 to charge to a voltage potential that is above the voltage potential of the receiver cell 116 and the discharge time selected preferably allows a substantial amount of charge from the charged capacitor 120 to transfer to the receiver cell 116. The discharge time may be selected to allow a maximum amount of charge to be transferred to the receiver cell 116, which may shorten the time required to balance charge amongst the cells 110. Alternatively, the charge and discharge times of the capacitor 120 may be adjusted based on the voltage potential difference of each selected combination of donor cells 114 and receiver cells 116. However, the charge and discharge times may be selected using any other suitable method.

In the variation of the charge balancing system that includes a sensor 112 that is coupled to each of the plurality of cells 110, the sensor 112 preferably includes a voltage sensor that senses the voltage potential within each cell 110. The detected voltage may then be used to derive the estimated state of charge of the cell, based on the cell's internal chemistry-dependent relationship between voltage and state of charge. Alternatively, the sensor 112 may include a current sensor that detects the current going through each cell 110. The detected current may then be integrated to derive the amount of charge that is contained within each cell 110. The sensor may also include a voltage sensor and a current sensor that cooperate to provide a more accurate measure of each cell's state of charge. However, any other suitable type of sensor may be used.

As shown in FIG. 3, the charge balancing system 100 of the preferred embodiments may also include digital isolators 150 that function to allow the plurality of switches 140 to be controlled by control signals that may be referenced to voltages that are different from the voltage potentials within the battery pack and/or the charge balancing circuit. The digital isolators 150 may be opto-isolators, magnetic isolators, or any other suitable type of digital isolator.

The processor 130 of the preferred embodiments functions to select a combination of donor cells and receiver cells from the plurality of cells. As mentioned above, the processor 130 may select a combination of any number of and any selection of cells as donor cells 114 and receiver cells 116 from the plurality of cells 110. The processor 130 preferably selects a cell with a higher voltage potential than that of the capacitor 120 as a donor cell 114 to charge the capacitor and preferably selects a cell with a lower voltage potential than the charged capacitor 120 as the receiver cell 116 to discharge the capacitor. Alternatively, the processor may select cells that are connected in series that have a combined voltage potential that is higher than that of the capacitor 120 as donor cells 114. In this variation, each of the donor cells 114 may have a voltage potential that is higher than that of the capacitor 120. Alternatively, in this variation, a donor cell 114 may have a voltage potential that is lower than that of the capacitor 120. However, the donor cells 114 and receiver cells 116 may be of any other suitable voltage potential relative to the capacitor 120.

In a first variation, the processor 130 selects the combination of donor cells 114 and receiver cells 116 based on the charge state of each cell 110. In this variation, the processor 130 preferably selects a donor cell 114 of a higher voltage potential than the capacitor to charge the capacitor 120 and a receiver cell 116 of a lower voltage potential than the charged capacitor 120. In this variation, the processor 130 may evaluate the charge of each cell 110 that is sensed by the sensor 112 and selects the cells 110 with the highest charge to be donor cells and cells 114 with the lowest charge to be receiver cells 116. Alternatively, the processor 130 may determine a desired charge level for each of the plurality of cells 110 and when any cell is detected to have a charge level higher than the desired charge level of that cell, the processor 130 selects that particular cell as a donor cell 114 and searches for a cell that has a charge level that is lower than (or substantially equal to) the desired charge level of that cell and selects that cell as a receiver cell 114. In this variation, the desired charge level of each cell may be substantially equal. The processor 130 may select a combination of donor cells 114 and receiver cells 116 in either of the first or second modes. If increased efficiency of charge transfer is desired, the processor may select a combination according to the first mode. If increased rate of charge transfer is desired, the processor 130 may select a combination according to the second mode. However, the processor 130 may select donor cells 114 and receiver cells 116 based on the charge state using any other suitable method.

In a second variation, the processor 130 selects the combination of donor cells 114 and receiver cells 116 by selecting a combination that is optimized relative to a characteristic selected from the resulting charge transfer rate between cells, the resulting charge transfer efficiency between cells, and the resulting charge balance of the battery pack. Because it may be difficult to determine a combination that optimizes for more than one of the above characteristics (for example, it may be difficult to find a combination that optimizes for both the charge transfer rate and the charge transfer efficiency because more energy is lost when the charge transfer rate is substantially high), the processor 130 may select a combination that optimizes relative to only one characteristic. In a first example, the processor is configured to select a combination of donor cells 114 and receiver cells 116 according to the first mode to optimize for high resulting charge transfer efficiency between cells. In a second example, the processor is configured to select a combination of donor cells 114 and receiver cells 116 according to the second mode to optimize for high resulting charge transfer rate between cells. However, the processor 130 may select any other suitable combination that optimizes for only one characteristic.

Figure 4:
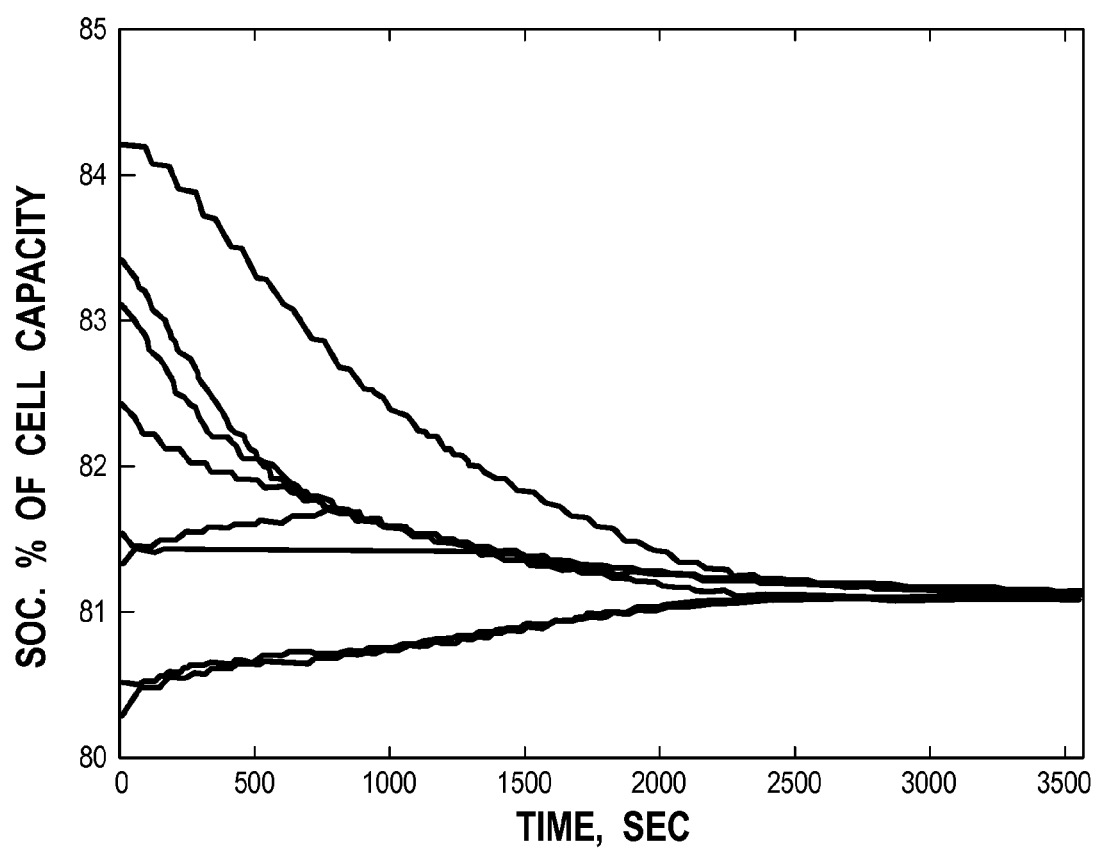
FIG. 4 is a graphical representation of the balance of charge within the plurality of cells.

The processor 130 may also select a combination that substantially optimizes for more than one characteristic. In a first example, the processor 130 may select a combination that optimizes one characteristic within limits for the other characteristics; for example, the processor 130 may select a combination that optimizes for the highest charge transfer efficiency that can be achieved while bringing all cells to within 1% of any other cell's state of charge within 4 hours. In a second example, the processor 130 may select a combination that optimizes performance measured by a metric that is the combination of multiple characteristics; for example, the processor 130 may select a combination that minimizes the weighted sum of the total charge lost and the standard deviation of the charge within each of the plurality of cells over a period of time. This type of optimization may result in a selection of a combination of donor cells 114 and receiver cells 116 according to either the first or the second mode. To select an optimized combination of donor cells 114 and receiver cells 116, the processor 130 may run optimization calculations. The optimization calculations are preferably based on the sensed charge within each cell 110. For example, the processor 130 may run a quadratic program that determines a set of donor and receiver cells in the plurality of cells 110 where, in the process of moving charge between cells, both rate of charge transfer and charge efficiency are maximized according to a desired trade-off between the two characteristics. Maximizing rate of charge transfer and charge efficiency may alternatively be thought of as minimizing total time to balance charge and total charge loss. A graph showing charge within each cell as a function of time during the cell balancing process for an exemplary battery pack is shown in FIG. 4. As shown in FIG. 4, implementation of the quadratic program results in the charge within each cell moving towards a common charge level without excessively decreasing the total charge contained within the battery pack, thus balancing the charge within the battery pack without excessively wasting energy.

In the second variation, the processor 130 may optimize for a combination of characteristics, with the relative importance ascribed to each characteristic differing based on the usage scenario. For example, as mentioned above, the rate of charge transfer is preferably high when the rate of energy transfer to and from the battery pack is high. In these scenarios, the optimization calculations preferably put more weight on maximizing rate of charge transfer (i.e., minimizing the total time to balance charge) and less weight on maximizing charge transfer efficiency (i.e., minimizing the total charge loss). To adjust weights of each characteristic, adjustable variables are preferably integrated into the optimization calculations. For example, in the variation that optimizes using a quadratic program, variables used to represent the weight of each characteristic may be integrated into the program and adjusted by the processor 130 when the preferences change. The processor 130 preferably detects when there is a high rate of energy transfer to and from the battery pack and implements the adjustment to the optimization calculations. Alternatively, the processor 130 may receive instructions to apply such adjustments, for example, the user may input into the processor 130 to prioritize for high rate of charge transfer and the processor 130 may implement the adjustment based on the input from the user. The user may provide an input that does not directly indicate an optimization preference, but the processor 130 may determine an optimization preference that best fits the input. This may be particularly useful when the battery pack is applied to a mobile device such as an electric vehicle and the user plugs the device into the electrical grid for charging. The processor 130 then determines from this user input that the optimization preference is for high charge transfer rate and not high charge transfer efficiency. Alternatively, the processor 130 may optimize equally for each characteristic. However, the processor 130 may utilize any other optimization method.

In a third variation, the processor 130 selects the combination of donor cells 114 and receiver cells 116 from a set of available combinations of donor cells and receiver cells. In this variation, the available combinations of donor cells and receiver cells may be determined by the connection capabilities of the plurality of switches 140. Each of the available combinations of donor cells and receiver cells is preferably assigned a score that is based on the resulting charge transfer rate between cells, the resulting charge transfer efficiency between cells, and the resulting charge balance of the battery pack. The processor 130 then selects the combination of donor cells and receiver cells based on the score; for example, the processor 130 may select the combination with the highest score. Similar to the second variation, the scores are preferably based on the usage scenario. For example, combinations according to the second mode may be assigned higher scores in usage scenarios with high rates of energy transfer to and from the battery pack and combinations of the first mode may be assigned higher scores in other usage scenarios. Alternatively, the processor 130 may select the combination based on the score by selecting the combination with the lowest score. Here, the combinations with the more desirable results are scored lower than those with less desirable results. The user may also adjust the scores based on user preference.

Figure 5:
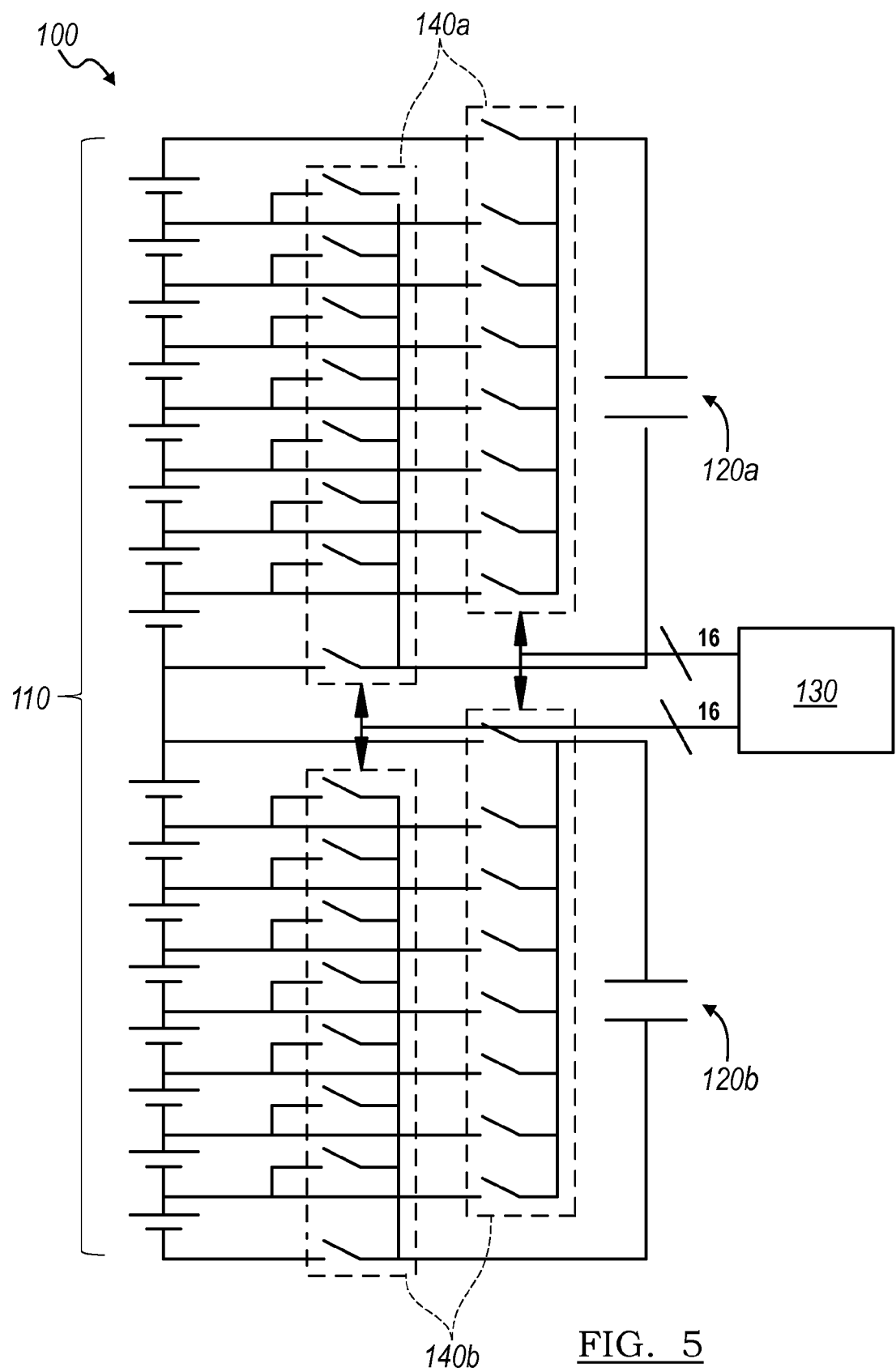
FIGS. 5 and 6 are schematic representations of variations of the charge balancing system with more than one charge balancing circuit.
Figure 6:
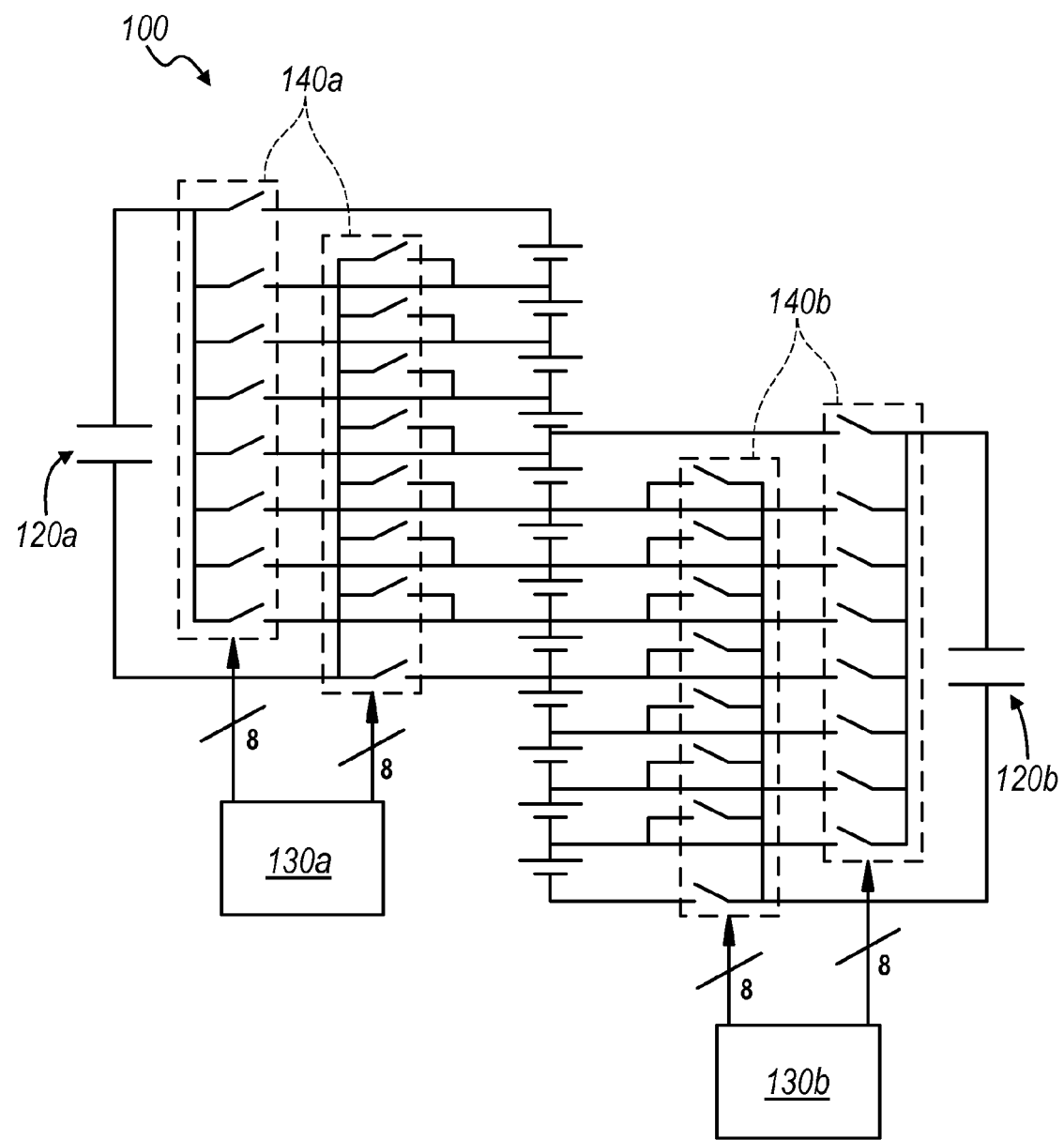

The charge balancing system 100 of the preferred embodiments may be expanded to balance charge between more than one charge balancing circuit connected to the plurality of cells 110, as shown in FIGS. 5 and 6. This may be particularly useful where the plurality of cells 110 includes a substantially high number of cells 110 that are connected in series. Because the amount of charge that each capacitor 120 may hold is relatively small relative to the charge held by each battery, the charge balancing system 100 may benefit from having two charge balancing circuits, each with a capacitor, to balance the charge within the battery pack. Additionally, if a substantially high number of cells 110 is connected to one charge balancing circuit, because of the increased voltage potential from the high number of cells 110, the capacitor and plurality of switches may need to be selected for much higher voltage stand off ratings, which may increase the cost of the charge balancing circuit. The battery pack may also include more than one string of cells 110 connected in series. In this variation, a charge balancing circuit may be coupled to each string of cells 110. Each charge balancing circuit is preferably coupled to a portion of the plurality of cells 110 and preferably includes a capacitor, a plurality of switches, and a processor that selects a combination of donor cells 114 and receiver cells 116 from the portion of the plurality of cells 110, as shown in FIG. 6. Alternatively, one processor may be used to determine donor cells 114 and receiver cells 116 for each charge balancing circuit, as shown in FIG. 5. The portions may be separate portions (shown in FIG. 5), but may alternatively share individual cells (shown in FIG. 6). In a first variation each charge balancing circuit may function to balance a portion of cells 110 independently from another portion of cells 110. In a second variation, the charge balancing circuits may cooperate to balance charge between portions of cells 110, thus balancing the charge amongst the entire string of cells 110. In this variation, charge balancing of the string of cells 110 may include distributing charge within a portion of cells 110 in a certain charge distribution profile. For example, in the variation with overlapping portions as shown in FIG. 6, the portion of cells 110 coupled to the second capacitor 120$b$ and the second charge balancing circuit may have lower overall charge than the portion of cells 110 coupled to the first capacitor 120$a$ and the first charge balancing circuit. To balance charge between the two portions, the first charge balancing circuit may distribute additional charge from the first portion into the overlapping cells 110, in other words, purposefully unbalancing the charge within the first portion of cells 110. The additional charge distributed to the overlapping cells is then transferred to other cells 110 within the second portion through the second charge balancing circuit, thus balancing charge across the entire string of cells 110. However, the cell balancing system too may be expanded in any other suitable way.

2. Method of Balancing Charge

Figure 7:
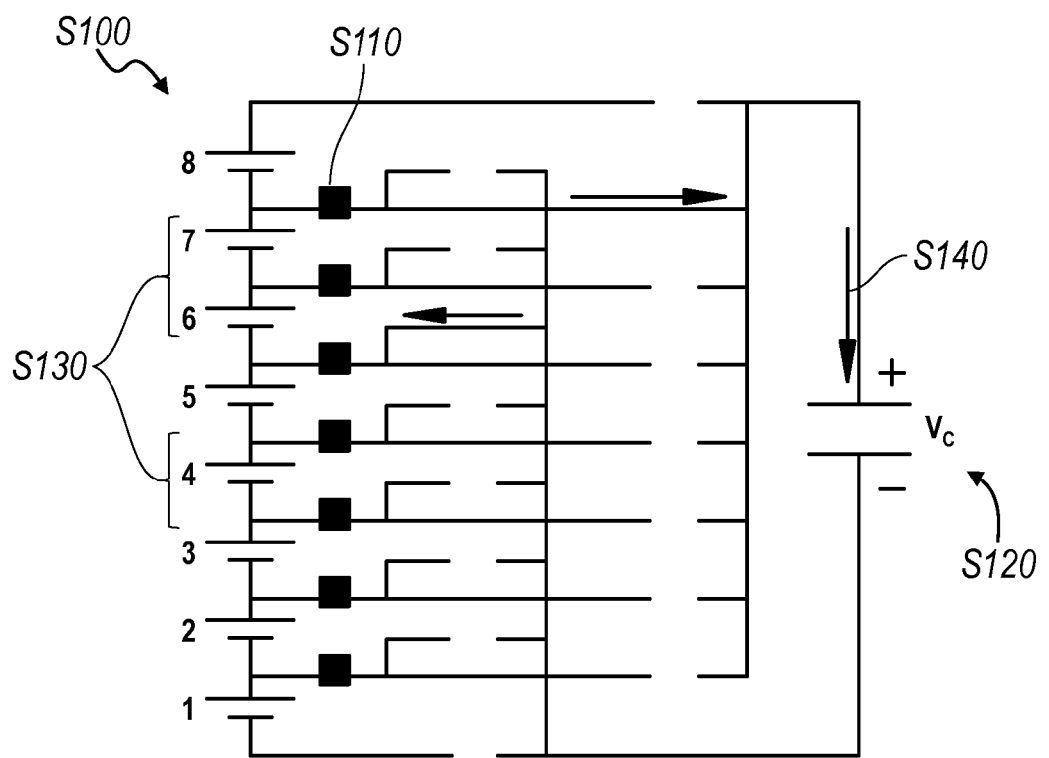
FIG. 7 is a schematic representation of the charge balancing method of the preferred embodiments.
Figure 7:
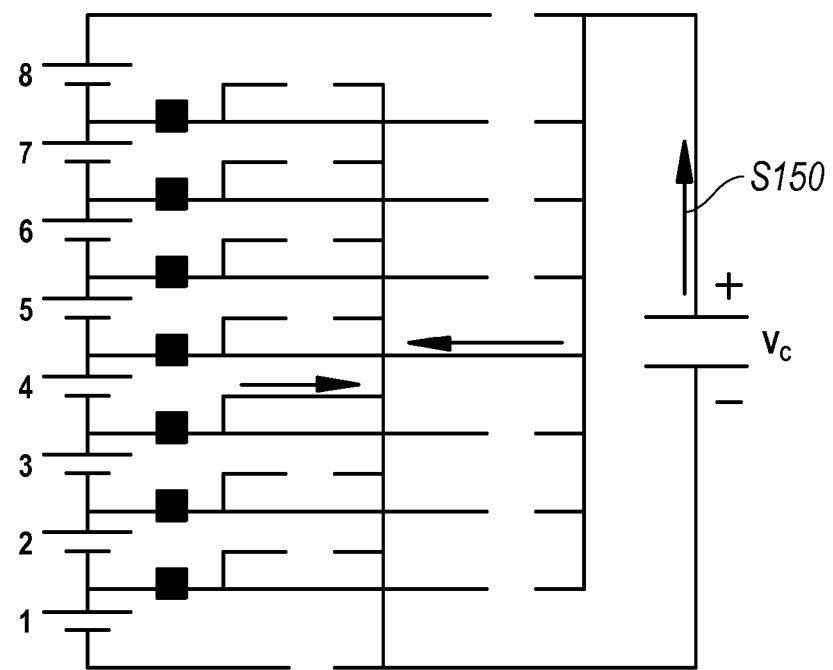

As shown in FIG. 7, the method S100 for balancing charge within a battery pack that includes a plurality of cells that are connected in series includes the steps of providing a capacitor S120, selecting a combination of donor cells and receiver cells from the plurality of cells in one of two modes: a first mode where the number of donor cells is equal to the number of receiver cells and a second mode where the number of donor cells is greater than the number of receiver cells S130, electrically coupling the capacitor to the donor cells to charge the capacitor S140, and electrically coupling the capacitor to the receiver cells to discharge the capacitor S150. In the method of the preferred embodiments, charge is moved between the plurality of cells through the charging and discharging of the capacitor in Steps S140 and S150, and the movement of charge between the donor cells and receiver cells preferably balances the charge within the battery pack. The charge balancing method S100 may also include sensing the charge in each of the plurality of cells S110. In this variation, the step of selecting a combination of donor cells and receiver cells from the plurality of cells also includes the step of selecting a combination of donor cells and receiver cells based on the sensed charge.

The step of selecting a combination of donor cells and receiver cells preferably includes the steps of selecting a cell of a higher voltage potential than the capacitor as a donor cell to charge the capacitor and selecting a cell of a lower voltage potential than the charged capacitor as a receiver cell to discharge the capacitor. Alternatively, the step of selecting a combination of donor cells and receiver cells may include the step of selecting cells connected in series that have a combined voltage potential that is higher than the capacitor as donor cells. In this variation, each of the donor cells may have a voltage potential that is higher than that of the capacitor. Alternatively, in this variation, a donor cell may have a voltage potential that is lower than that of the capacitor. However, the step of selecting a combination of donor cells and receiver cells may select cells of any other suitable voltage potential relative to the capacitor.

A first variation of the step of selecting a combination of donor cells and receiver cells from the plurality of cells S130 includes selecting the combination of donor cells and receiver cells based on the charge state of the cells. For example, a cell with a voltage potential that is higher than the capacitor is selected as a donor cell and another cell with a voltage potential that is lower than the donor cell and the charged capacitor is selected as the receiver cell, thus transferring charge between the donor cell and the receiver cell. In this variation, the step of selecting a combination of donor cells and receiver cells may include selecting a combination according to either the first or second modes. To increase the rate of charge transfer between the donor cell and the capacitor and, subsequently, the charged capacitor and the receiver cell, the step of selecting a combination of donor cells and receiver cells may include selecting a combination according to the second mode. To increase the efficiency of charge transfer between cells, the step of selecting a combination of donor cells and receiver cells may include selecting a combination according to the first mode. However, any other suitable combination of donor cells and receiver cells may be selected based on charge.

A second variation of the step of selecting a combination of donor cells and receiver cells from the plurality of cells includes the step of selecting a combination that is optimized relative to a characteristic selected from the resulting charge transfer rate between cells, the resulting charge transfer efficiency between cells, and the resulting charge balance of the battery pack. The step of selecting a combination of donor cells and receiver cells may optimize relative to only one characteristic. In a first example, the step of selecting a combination of donor cells and receiver cells optimized relative to a characteristic includes the step of selecting combinations according to the first mode when optimizing for high charge transfer efficiency. In a second example, the step of selecting a combination of donor cells and receiver cells optimized relative to a characteristic includes the step of selecting combinations according to the second mode when optimizing for fast charge transfer rate. The step of selecting a combination of donor cells and receiver cells may also optimize relative to each characteristic. This type of optimization may result in selecting a combination of either the first or the second modes. In this variation, the step of selecting a combination of donor cells and receiver cells optimized relative to a characteristic includes running optimization calculations. The step of running optimization calculations preferably utilizes the sensed charge of each of the cells. For example, the step of optimizing may include running a quadratic program that determines a charge balance for the cells in the battery pack that will maximize both the charge transfer rate and the charge transfer efficiency between the plurality of cells. The step of selecting a combination of donor cells and receiver cells that is optimized for each characteristic may include optimizing each characteristic equally, but may alternatively include optimizing each characteristic at a different level. The different levels of optimization may be based on usage scenario and/or user preference.

A third variation of the step of selecting a combination of donor cells and receiver cells from the plurality of cells includes the step of selecting a combination from a set of available combinations of donor cells and receiver cells. The step of selecting a combination from a set of available combinations of donor cells and receiver cells preferably includes the steps of assigning each available combination with a score that is based on the resulting charge transfer rate between cells, the resulting charge transfer efficiency between cells, and the resulting charge balance of the battery pack, and selecting a combination based on the score, for example, selecting the combination with the highest score. The step of assigning a score to each available combination preferably also includes adjusting the score based on the usage scenario, for example, increasing the score of a combination according to the second mode when there is a high rate of energy transfer to and from the battery pack and increasing combinations the score of a combination according to the first mode in other usage scenarios. The step of adjusting the score based on the usage scenario may also include adjusting the score based on a user preference provided by the user.

While the step of selecting a combination of donor cells and receiver cells from the plurality of cells of the battery pack is preferably one of the above variations, any suitable combination of the above variations or any other suitable method for selecting a combination may be used.

As a person skilled in the art will recognize from the previous detailed description and from the figures and claims, modifications and changes can be made to the preferred embodiments of the invention without departing from the scope of this invention defined in the following claims.

We claim:
1. A system for balancing charge within a battery pack comprising:
   a plurality of cells connected in series, wherein the plurality of cells comprise a first portion of cells and a second portion of cells;
   a capacitor;
   a processor operable between:
      (1) a first mode, wherein the processor selects a combination of donor and receiver cells from the first portion of cells, the combination comprising equal numbers of donor cells and receiver cells; and
      (2) a second mode, wherein the processor selects a combination of donor and receiver cells from the first portion of cells, the combination comprising more donor cells than receiver cells;
   a plurality of switches transiently coupling the plurality of cells to the capacitor, the plurality of switches operable between:
      a first configuration, wherein the switches simultaneously electrically connect the capacitor to the donor cells of the combination of the first or second modes; and
      a second configuration, wherein the switches simultaneously electrically connect the capacitor to the receiver cells of the combination of the first or second modes;
   a second capacitor;

wherein the processor is further operable between:
(1) a third mode, wherein the processor selects a second combination of donor cells and receiver cells from the second portion of cells, the second combination comprising an equal number of donor cells and receiver cells; and
(2) a fourth mode, wherein the processor selects a second combination of donor cells and receiver cells from the second portion of cells, the second combination comprising more donor cells than receiver cells;
a second plurality of switches transiently coupling the second portion of cells to the second capacitor, the second plurality of switches operable between:
a first configuration, wherein the switches simultaneously electrically connect the second capacitor to the donor cells of the second combination of the third or fourth modes; and
a second configuration, wherein the switches simultaneously electrically connect the second capacitor to the receiver cells of the second combination of the third or fourth modes;
wherein charge is transferred between the first and second portions of the plurality of cells.

2. The system of claim 1, further comprising a sensor coupled to each of the cells that senses or determines the charge of each cell, and wherein the processor mode is based on the sensed charge.

3. The system of claim 2, wherein the sensor is a voltage sensor.

4. The system of claim 1, wherein the switches are transistors.

5. The system of claim 4, wherein the switches are each field effect transistors.

6. The system of claim 1, wherein the switches comprise a first set of switches, each with one end electrically connected to the negative terminal of a cell and another end electrically connected to one terminal of the capacitor, and a second set of switches, each with one end electrically connected to the positive terminal of a cell and another end electrically connected to the other terminal of the capacitor, wherein an actuated switch from the first set of switches and an actuated switch from the second set of switches electrically connects the cells in between the actuated switches in parallel with the capacitor.

7. The system of claim 6, wherein each of the switches in the first set of switches and the second set of switches are individually controlled.

8. The system of claim 1, wherein the switches comprise a multiplexer.

9. The system of claim 8, wherein the switches comprise a first multiplexer electrically connected to the positive terminal of each of the cells and to one terminal of the capacitor, and a second multiplexer electrically connected to the negative terminal of each of the cells and to the other terminal of the capacitor.

10. The system of claim 1, wherein a cell of the plurality of cells is a member of both the first portion and second portion of the plurality of cells.

11. The system of claim 1, wherein the processor includes a first processor that is configured to select a combination of donor cells and receiver cells from the first portion of the plurality of cells and a second processor that is configured to select a combination of donor cells and receiver cells from the second portion of the plurality of cells.

12. A method for balancing charge within a battery pack with a plurality of cells connected in series, wherein the plurality of cells comprise a first portion of cells and a second portion of cells, the method comprising the steps of:
selecting a combination of donor cells and receiver cells from the first portion of cells, comprising selecting between:
(1) a first combination comprising an equal number of donor cells and receiver cells; and
(2) a second combination comprising more donor cells than receiver cells;
selecting a combination of donor cells and receiver cells from the second portion of cells, comprising selecting between:
(1) a third combination of donor cells and receiver cells comprising an equal number of donor cells and receiver cells; and
(2) a fourth combination of donor cells and receiver cells comprising more donor cells than receiver cells;
charging a first capacitor by simultaneously electrically connecting the first capacitor to the donor cells of the selected first or second combination of the first portion of cells;
discharging the first capacitor by simultaneously electrically connecting the first capacitor to the receiver cells of the selected first or second combination of the first portion of cells;
charging a second capacitor by simultaneously electrically connecting the second capacitor to the donor cells of the selected third or fourth combination of the second portion of cells;
discharging the second capacitor by simultaneously electrically connecting the second capacitor to the receiver cells of the selected third or fourth combination of the second portion of cells; and
transferring charge between the first and second portions of cells.

13. The method of claim 12, further comprising sensing the charge in each of the cells, and wherein the step of selecting a combination of donor cells and receiver cells is based on the sensed charges.

14. The method of claim 12, wherein the step of selecting a combination of donor cells and receiver cells includes the steps of selecting a cell having a greater voltage potential than the capacitor for the donor cell and selecting a cell having a lower voltage potential than the charged capacitor for a receiver cell.

15. The method of claim 12, wherein the step of selecting a combination of donor cells and receiver cells includes the steps of selecting a plurality of donor cells having a combined voltage potential greater than the voltage potential of the capacitor; wherein electrically coupling the capacitor to the donor cells further comprises connecting the selected donor cells in series.

16. The method of claim 12, wherein the step of selecting a combination of donor cells and receiver cells includes selecting a combination that is optimized relative to the resulting charge transfer rate between cells, the resulting charge transfer efficiency between cells, and the resulting charge balance of the battery pack.

17. The method of claim 15, wherein the step of selecting a combination includes running a quadratic program that determines a combination that is optimized relative to the resulting charge transfer rate between cells, the resulting charge transfer efficiency between cells, and the resulting charge balance of the battery pack.

18. The method of claim 12, wherein selecting between the first and second combination comprises selecting the first combination in response to a requirement for a high resulting charge transfer efficiency.

19. The method of claim 12, wherein the step of selecting between the first and second combination comprises selecting the second combination in response to a requirement for a fast resulting charge transfer rate.

20. The method of claim 12, wherein the step of selecting a combination of donor cells and receiver cells from the plurality of cells includes selecting a combination from a set of available combinations of donor cells and receiver cells.

21. The method of claim 20, wherein the step of selecting a combination from a set of available combinations of donor cells and receiver cells includes the steps of assigning a score to each available combination based on the resulting charge transfer rate between cells, resulting charge transfer efficiency between cells, and resulting charge balance of the battery pack, and selecting a combination based on the score.

22. The method of claim 21, wherein the step of assigning a score includes adjusting the score based on a given usage scenario.

23. The method of claim 22, wherein the step of adjusting the score includes adjusting the score based on the rate of energy transfer to and from the battery pack.

24. The method of claim 22, wherein the step of adjusting the score includes adjusting the score based on a user preference.

* * * * *